May 3, 1932. A. F. MASURY 1,856,773
VEHICLE CONSTRUCTION
Filed Nov. 18, 1930 3 Sheets-Sheet 1

Inventor:
Alfred F. Masury
By his Attorneys
Redding, Greeley, O'Shea & Campbell

May 3, 1932.  A. F. MASURY  1,856,773
VEHICLE CONSTRUCTION
Filed Nov. 18, 1930   3 Sheets-Sheet 2

Inventor:
Alfred F. Masury.
By his Attorneys
Redding, Greeley, O'Shea & Campbell May 3, 1932.  A. F. MASURY  1,856,773
VEHICLE CONSTRUCTION
Filed Nov. 18, 1930   3 Sheets-Sheet 3
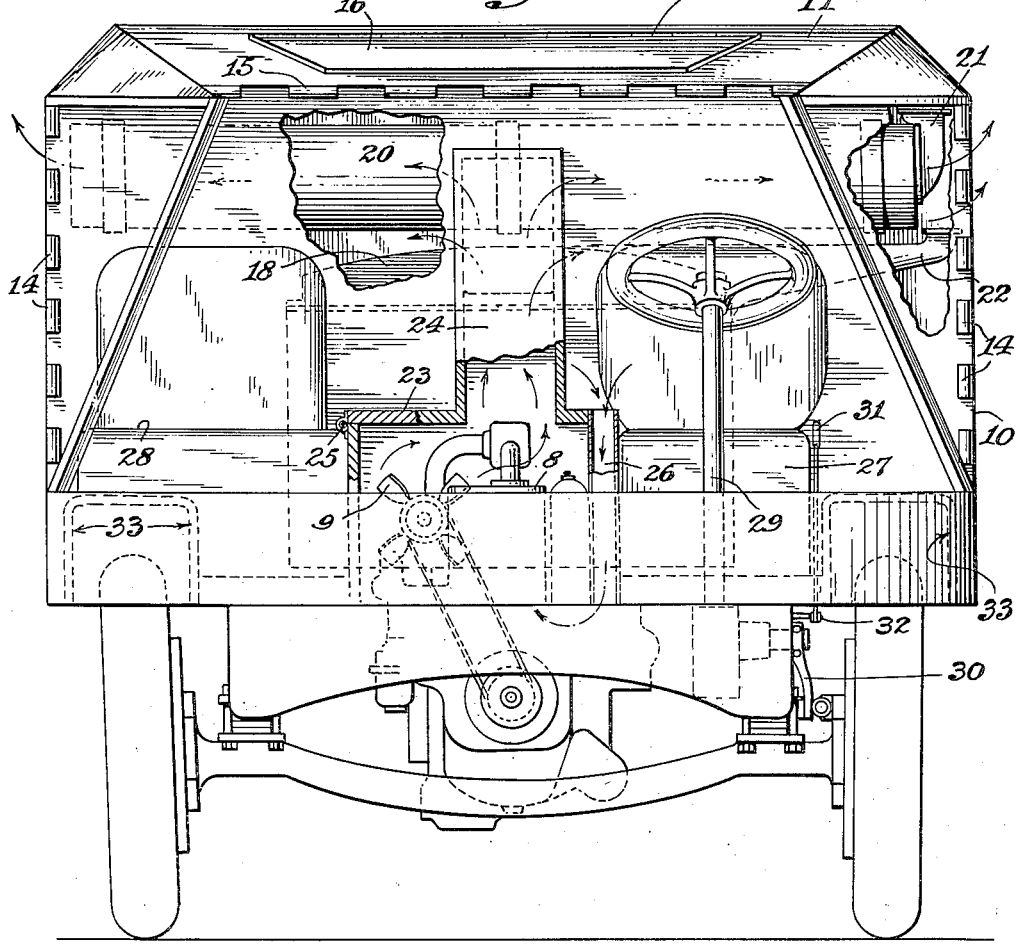

Patented May 3, 1932

1,856,773

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

VEHICLE CONSTRUCTION

Application filed November 18, 1930. Serial No. 496,388.

The present invention relates to motor vehicle constructions and embodies, more specifically, an improved cab and chassis construction for vehicles of the commercial type, wherein the maximum available platform space for loading is obtained, the available space provided by the construction described herein being considerably greater than the space heretofore provided in vehicles of this character.

More specifically, the invention relates to an improved chassis construction wherein the control elements and auxiliary mechanism of the vehicle power plant are so mounted that an increased platform area is provided in the vehicle body for receiving pay loads. In this connection, existing designs have uniformly provided the control elements for the vehicle rearwardly of the power plant and auxiliary mechanism, thus utilizing a portion of the total platform area of the chassis for the driver's seat and other dead load. It is proposed herein to utilize this space heretofore comprising dead load and accommodating the driver, for pay loads, the driver being seated alongside the engine and the control elements being so mounted as to facilitate operation of the vehicle from such position.

It is a further object of the invention to provide a construction wherein a vehicle may be effectively controlled from a position wherein the operator will not utilize any of the useful space of the chassis and thus preserve a maximum space for the pay load.

A further object of the invention is to provide a construction of the above character wherein the cab for housing the operator is utilized as an engine housing, as well as a housing for the auxiliary elements of the vehicle power plant.

A further object of the invention is to provide an improved vehicle cab construction, wherein the radiator is mounted within the cab rearwardly of the driver's seat and receives a flow of air from a fan on the transmission shaft while the engine, which is mounted within the cab is cooled by a separate fan.

A further object of the invention is to provide a construction of the above character, wherein the driver is mounted beside the engine and forwardly of the radiator, such elements being included within the vehicle cab.

A further object of the invention is to provide a cab for a motor vehicle which is adapted to house the engine and associated elements auxiliary thereto, the cab being so constructed as to afford a convenient and effective means of providing access thereto.

Further objects, not specifically enumerated above, will be apparent as the invention is described in greater detail in connection with the accompanying drawings, wherein:

Figure 3 is a view in front elevation, with the front and side doors removed from the hinges and showing the cab construction.

Figure 1:
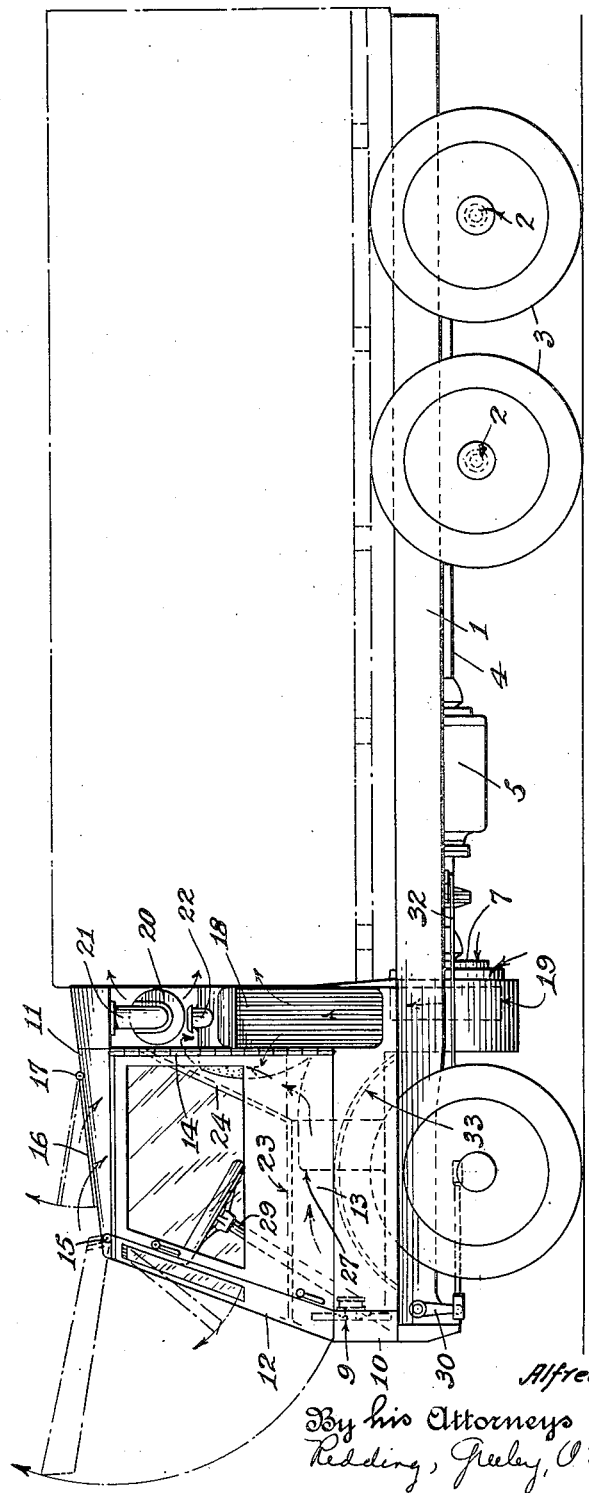
Figure 1 is a view in side elevation, showing a vehicle constructed in accordance with the present invention.
Figure 2:
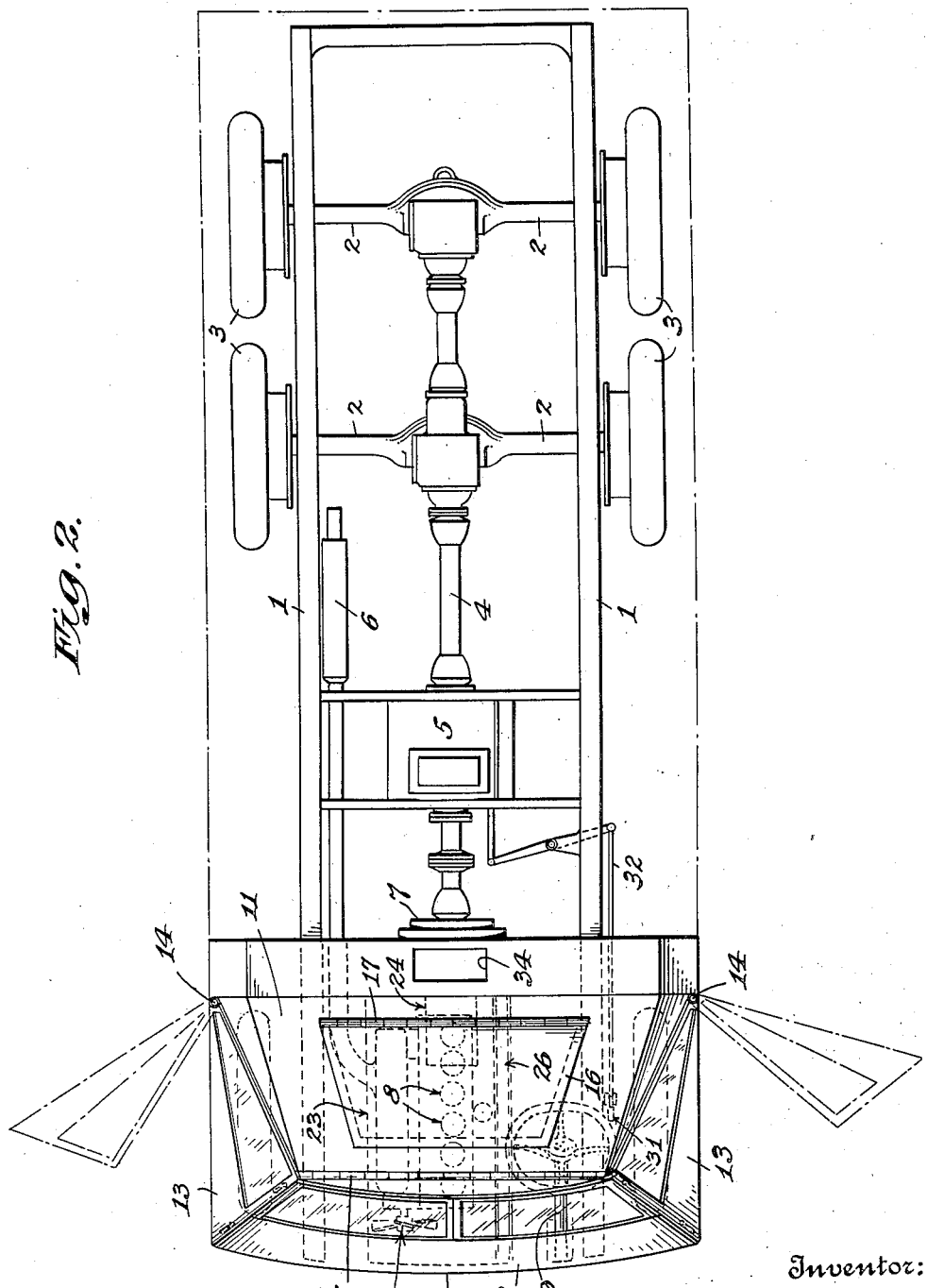
Figure 2 is a plan view of a motor vehicle chassis constructed in accordance with the present invention.

Referring to the above drawings, a vehicle chassis is shown as formed with frame members 1 and driving axles 2. Rear driving wheels 3 are of usual construction and receive power from transmission shaft 4 and gear shifting mechanism 5. The engine exhaust muffler is shown at 6 and clutch bell housing at 7. These elements are of standard construction and will not be described in further detail herein inasmuch as they form no part of the present invention.

As indicated in Figure 1, the space on the chassis available for the vehicle body is shown in dot and dash lines, this platform space being greater than heretofore available as will be apparent upon further detailed description of the construction. Forwardly of such platform space, the engine 8 of the vehicle is provided, this engine being of usual form and driving a fan 9 forwardly thereof to effect ventilation of the engine compartment described hereinafter.

Over the engine and associated elements, a cab 10 is mounted, this cab having a permanent top 11, a front 12 and sides 13. The sides are preferably hinged at 14 upon a vertical axis and thus swing outwardly and rearwardly to provide access to the cab, the front likewise being hinged at 15 upon a horizontal axis to enable the same to be swung upwardly and rearwardly as indicated by the dot and dash arrow in Figure 1. Further provision for ventilating the cab may be made in the form of a door 16 which is hinged in the top at 17 and may be suitably adjusted in a desired position. It will thus be seen that the cab is so constructed as to enable the interior thereof to be exposed from both the sides and front, thus facilitating the inspection and removal of the elements contained therein, as well as the ventilation thereof.

In the rear portion of the cab, radiator 18 is mounted, this radiator being cooled by air from a fan 19, mounted upon a transmission shaft. The air through such radiator passes out at the sides of the cab as does the air flowing through the engine compartment and directed by the fan 9. Above the radiator 18 is a gasoline tank 20, a filler spout 21 being provided therefor at one side of the cab and a filler spout and inlet 22 being provided for the radiator at the same side of the cab, as clearly shown in Figure 3.

Within the cab and about the engine 8 are partitions 23 which form an engine compartment to effect the proper ventilation thereof and prevent the air directed by fan 9 from escaping into the interior of the cab. The compartment terminates at its rear extremity in an upwardly and rearwardly extending duct 24 which communicates with the chamber in which the gasoline tank and radiator are mounted, thus permitting the air from the engine compartment to escape through an outlet 34 in the top of the cab and above the gasoline tank 20. One or more sides of the compartment 23 may be hinged as at 25 to facilitate inspection and repair of the engine and a duct 26 is preferably provided between the interior of the cab and the engine compartment whereby air will be sucked into the duct from the interior of the cab and thus the ventilation of the cab effected.

Upon the left of the engine compartment, a driver's seat 27 is provided while upon the other side thereof an operator's seat 28 is mounted. The room ordinarily occupied by these seats is thus utilized as useful space for the pay load of the vehicle and the maximum available platform space thus materially increased. The steering column 29 is mounted forwardly of the driver's seat and a suitable connection is provided between the same and the dirigible wheels, this connection being illustrated conventionally at 30. Lever 31 is connected to a suitable linkage 32 for effecting the gear changes in a well known fashion and further description of this mechanism is unnecessary herein inasmuch as such mechanism falls within standard practice and constitutes no part of the present invention.

Wheel housings 33 are provided above the dirigible wheels and are thus formed within the cab 10. The positioning of the elements in a manner described above will be seen to afford a highly compact engine and cab construction, the space heretofore consumed by the operator and control elements being entirely available for pay loads inasmuch as these elements have been placed within the cab and upon either side of the engine, the cab proper terminating at the rear extremity of the engine. Placing the radiator and gasoline tank rearwardly of the engine and operator not only protects the same against damage but improves the accessibility and ventilation of the cab.

While the invention has been described with specific reference to the accompanying drawings, it is not to be limited, save as defined in the appended claims.

I claim as my invention:

1. A vehicle construction including a chassis, an engine mounted thereon at the forward end, an operator's seat mounted at one side of the engine, a radiator mounted rearwardly of the seat and engine, and a cab enclosing the radiator, seat and engine.

2. A vehicle construction including a chassis, an engine mounted thereon at the forward end, seats mounted upon opposite sides of the engine, a radiator mounted rearwardly of the seats and engine, and a cab enclosing the radiator, seats and engine, said cab being formed with an aperture adjacent the radiator to provide for the escape of a cooling medium from the radiator.

3. A vehicle construction including a chassis, an engine mounted thereon at the forward end, a compartment over the engine, an operator's seat mounted at one side of the engine, a radiator mounted rearwardly of the engine and seat, and a cab mounted over the engine compartment, seat, and radiator.

4. A vehicle construction including a chassis, an engine mounted thereon at the forward end, a compartment over the engine, a fan mounted in the forward end of the compartment, an operator's seat mounted at one side of the engine, a radiator mounted rearwardly of the engine and seat, and a cab mounted over the engine compartment, seat, and radiator.

5. A vehicle contruction including a chassis, an engine mounted thereon at the forward end, a compartment over the engine, a fan mounted in the forward end of the compartment, an operator's seat mounted at one side of the engine, a radiator mounted rearwardly of the engine and seat, a compartment for the radiator communicating with the engine compartment, and a cab mounted over the engine, radiator and seat.

6. A vehicle construction including a chassis, an engine mounted thereon at the forward end, a compartment over the engine, a fan mounted in the forward end of the compartment, an operator's seat mounted at one side of the engine, a radiator mounted rearwardly of the engine and seat, a compartment for the radiator communicating with the engine compartment, a cab mounted over the engine, radiator, and seat, and a ventilating passage between the cab and engine compartment.

7. A vehicle construction including a chassis, an engine mounted thereon at the forward end, a compartment over the engine, a fan mounted in the forward end of the compartment, an operator's seat mounted at one side of the engine, a radiator mounted rearwardly of the engine and seat, a compartment for the radiator communicating with the engine compartment, and a cab mounted over the engine, radiator and seat, said cab having its sides hinged on a vertical axis to swing rearwardly and its front hinged on a horizontal axis to swing upwardly.

This specification signed this 8th day of November, A. D. 1930.

ALFRED F. MASURY.